(12) United States Patent
Kurachi et al.

(10) Patent No.: US 12,545,201 B2
(45) Date of Patent: Feb. 10, 2026

(54) IN-VEHICLE COMMUNICATION DEVICE, IN-VEHICLE RELAY DEVICE, IN-VEHICLE COMMUNICATION SYSTEM AND COMMUNICATION METHOD

(71) Applicants: NATIONAL UNIVERSITY CORPORATION TOKAI NATIONAL HIGHER EDUCATION AND RESEARCH SYSTEM, Nagoya (JP); AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Ryo Kurachi, Nagoya (JP); Hiroaki Takada, Nagoya (JP); Hiroshi Ueda, Yokkaichi (JP)

(73) Assignees: Nation University Corporation Tokai National Higher Education And Research System, Nagoya (JP); AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 155 days.

(21) Appl. No.: 18/566,727
(22) PCT Filed: May 16, 2022
(86) PCT No.: PCT/JP2022/020317
  § 371 (c)(1),
  (2) Date: Dec. 4, 2023
(87) PCT Pub. No.: WO2022/255069
  PCT Pub. Date: Dec. 8, 2022

(65) Prior Publication Data
  US 2024/0286564 A1 Aug. 29, 2024

(30) Foreign Application Priority Data
  Jun. 4, 2021 (JP) ................................. 2021-094335

(51) Int. Cl.
  *B60R 16/023* (2006.01)
(52) U.S. Cl.
  CPC .................................. *B60R 16/023* (2013.01)
(58) Field of Classification Search
  CPC ..... B60R 16/023; H04L 12/46; H04L 51/214; H04L 65/61; H04L 12/28
  See application file for complete search history.

(56) References Cited

U.S. PATENT DOCUMENTS 6,263,268 B1   7/2001 Nathanson
12,266,225 B2* 4/2025 Kawauchi ........... H04L 12/4641
           (Continued)

FOREIGN PATENT DOCUMENTS

JP   2005-295342 A   10/2005
WO   WO2014147746 A1  9/2014

OTHER PUBLICATIONS

International Search Report, Application No. PCT/JP2022/020317, mailed Jul. 26, 2022. ISA/Japan Patent Office.
(Continued)

*Primary Examiner* — Behrang Badii
(74) *Attorney, Agent, or Firm* — Honigman LLP

(57) ABSTRACT

An in-vehicle communication system includes an in-vehicle communication device having a stream database and multiple in-vehicle relay devices connected to the in-vehicle communication device. Each in-vehicle relay device is connected to multiple in-vehicle control devices. The in-vehicle communication device and the in-vehicle relay device communicate with each other in a first communication protocol. The in-vehicle relay device and the in-vehicle control devices communicate with each other in a second communication protocol. The in-vehicle communication device stores time-series information received from the in-vehicle relay device in the stream database, and delivers the infor- (Continued)

mation stored in the stream database to the in-vehicle relay device. The in-vehicle relay device receives information delivered from the in-vehicle communication device and transmits it to the in-vehicle control devices and receives information transmitted from the in-vehicle control devices and transmits it to the in-vehicle communication device to store the information in the stream database.

1 Claim, 13 Drawing Sheets

(56) References Cited

U.S. PATENT DOCUMENTS

| | | |
|---|---|---|
| 2002/0150050 A1 | 10/2002 | Nathanson |
| 2007/0244614 A1 | 10/2007 | Nathanson |
| 2009/0240383 A1 | 9/2009 | Hung |
| 2015/0372862 A1 | 12/2015 | Namihira |
| 2017/0048359 A1 | 2/2017 | Wagner et al. |
| 2020/0137099 A1 | 4/2020 | Haga et al. |
| 2020/0156679 A1 | 5/2020 | Otsuki et al. |
| 2021/0126917 A1* | 4/2021 | Lin .................. H04L 12/40032 |
| 2021/0160315 A1 | 5/2021 | Linn-Moran et al. |
| 2021/0176090 A1* | 6/2021 | Yamamoto ............ B60R 16/023 |
| 2021/0397568 A1 | 12/2021 | Mashino et al. |
| 2022/0123962 A1* | 4/2022 | Orito .................. H04L 65/1023 |
| 2022/0355750 A1 | 11/2022 | Yamamoto et al. |
| 2022/0417718 A1 | 12/2022 | Yoshida et al. |

OTHER PUBLICATIONS

SOME/IP Protocol Specification [on-line], SOME/IP Protocol Specification, 1.1.0, AUTOSAR, Mar. 17, 2017.

* cited by examiner

FIG. 3

Delivery destination table

| Delivery destination | Delivery destination |
|---|---|
| Relay ECU_A | Vehicle speed, engine revolution number, steering angle, ... |
| Relay ECU_B | Steering angle, shift position, ... |
| Relay ECU_C | Position information, vehicle speed, ... |
| ⋮ | ⋮ |

IN-VEHICLE COMMUNICATION DEVICE, IN-VEHICLE RELAY DEVICE, IN-VEHICLE COMMUNICATION SYSTEM AND COMMUNICATION METHOD

CROSS-REFERENCE TO RELATED APPLICATIONS

This application is the U.S. national stage of PCT/JP2022/020317 filed on May 16, 2022, which claims priority of Japanese Patent Application No. JP 2021-094335 filed on Jun. 4, 2021, the contents of which are incorporated herein.

TECHNICAL FIELD

The present disclosure relates to an in-vehicle communication device, an in-vehicle relay device, an in-vehicle communication system and a communication method that transmit and receive various information within a vehicle.

BACKGROUND

Conventionally, as a communication protocol employed for communication between multiple devices such as ECUs (Electronic Control Units) or the like mounted on a vehicle, the CAN (controller area network) communication protocol has widely been used.

Japanese Patent Application Laid-Open No. 2009-220800 proposes a detection/control integration device that is connected to the CAN of a vehicle, causes in-vehicle devices to perform action by a device diagnostic command, captures status feedback data transmitted from the in-vehicle devices and determines the operation status of the in-vehicle devices.

An in-vehicle communication device according to the present aspect comprises a communication unit that is connected to a plurality of individual in-vehicle devices through communication lines and communicates with the in-vehicle devices through the communication lines in compliance with a communication protocol for service-oriented communication; a stream database that stores time-series information received from the in-vehicle devices by the communication unit; and a processing unit that performs processing of delivering time-series information stored in the stream database to the in-vehicle devices.

The present application can be not only embodied as a device having such a characteristic control unit but also embodied as a method executing such characteristic processing in steps and as a computer program causing the computer to execute such steps. The present application can be embodied as a semiconductor integrated circuit executing a part or all of these devices or as another device or system including these devices.

Japanese Unexamined Patent Application Publication No. 2004-511188 proposes a method of establishing a data link between a vehicle and a remote monitoring recipient, collecting vehicle operation data from a data source in the vehicle, packaging the vehicle operation data in a data packet using a protocol derived from Simple Network Management Protocol (SNMP), and transmitting the vehicle operation data to the remote monitoring recipient by conveying the data packet over the data link.

SUMMARY

The system described in Japanese Patent Application Laid-Open No. 2009-220800 is a system in which multiple devices mounted on a vehicle communicate in compliance with the CAN communication protocol. The system described in Japanese Unexamined Patent Application Publication No. 2004-511188 employs SNMP as a communication protocol. In recent years, self-driving of vehicles has been developed, for example, and higher vehicle functionality has been promoted. As vehicles become more sophisticated, the use of Ethernet (registered trademark) communication protocol for in-vehicle communication has been considered. Attention is being given to Scalable service-Oriented MiddlewarE over IP (SOME/IP) communication protocol defined by AUTomotive Open System ARchitecture (AUTOSAR) as a communication protocol for the upper layer of the Ethernet. SOME/IP is service-oriented communication where a service-oriented architecture is applied to vehicle communication.

The present disclosure is made in view of such circumstances, and an object is to provide an in-vehicle communication device, an in-vehicle relay device, an in-vehicle communication system and a communication method that can anticipate contribution to introduction of the service-oriented communication into in-vehicle communication.

Effects

The description above can anticipate contribution to introduction of the service-oriented communication into in-vehicle communication.

BRIEF DESCRIPTION OF DRAWINGS

FIG. 3 is a schematic diagram illustrating the configuration of a delivery destination table.

DETAILED DESCRIPTION OF PREFERRED EMBODIMENTS

Figure 1:
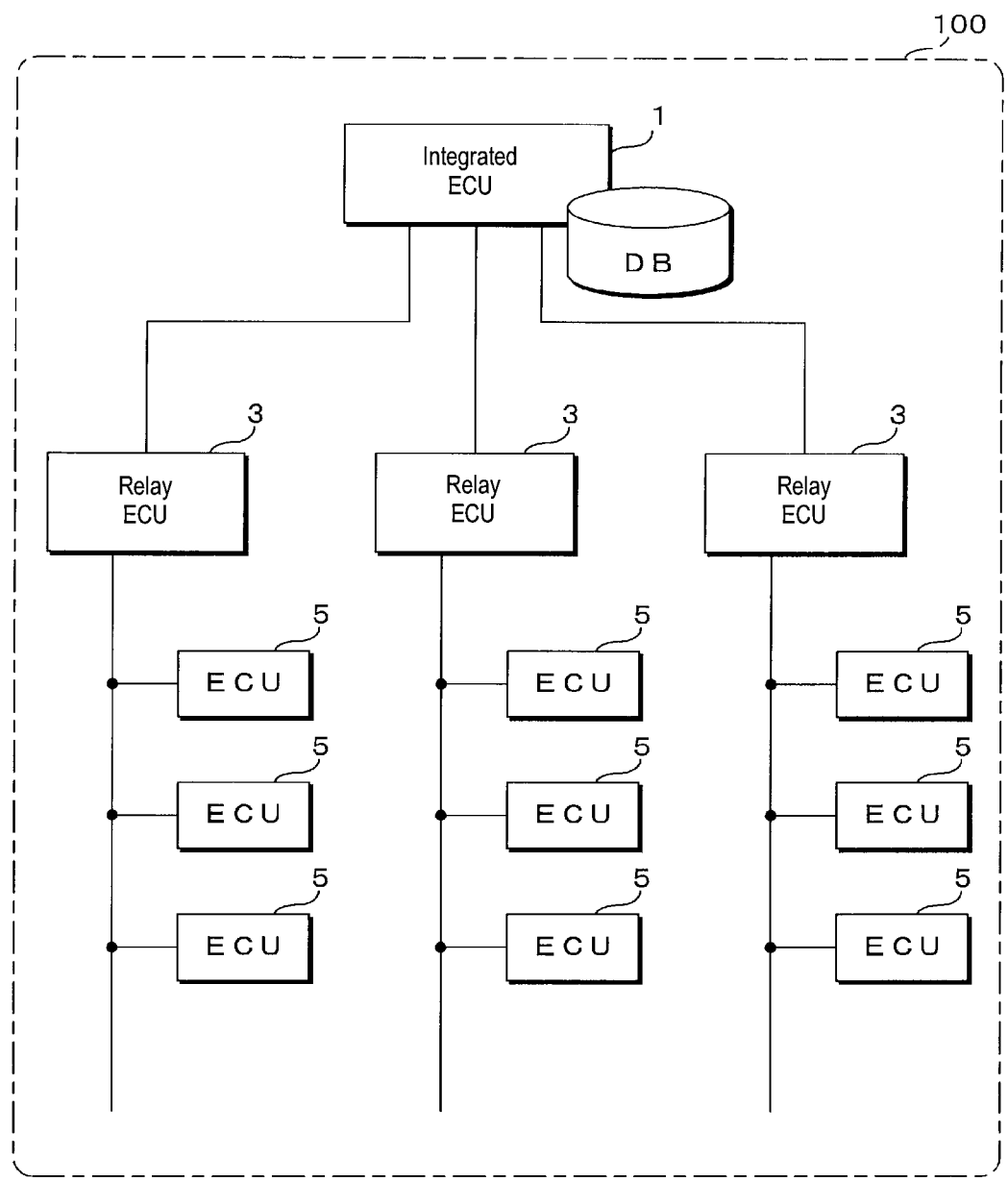
FIG. 1 is a schematic diagram of an overview of an in-vehicle communication system according to a first embodiment.

Embodiments of the present disclosure are first listed and described. At least parts of the embodiments described below may arbitrarily be combined.

An in-vehicle communication device according to the present aspect comprises: a communication unit that is connected to a plurality of in-vehicle devices through individual communication lines and communicates with the in-vehicle devices through the communication lines in compliance with a communication protocol for service-oriented communication; a stream database that stores time-series information received from the in-vehicle devices by the communication unit; and a processing unit that performs processing of delivering time-series information stored in the stream database to the in-vehicle devices.

In the present aspect, the in-vehicle communication device to which the plurality of in-vehicle devices are connected through the individual communication lines communicate with the in-vehicle devices in compliance with the communication protocol for service-oriented communication. The in-vehicle communication device has a stream database storing time-series information received from the in-vehicle devices and performs processing of delivering information stored in the stream database to one or more in-vehicle devices. This allows the in-vehicle communication device to centrally manage the time-series information within the vehicle and operate as a server that provides time-series information in the service-oriented communication, which can anticipate contribution to introduction of the service-oriented communication into in-vehicle communication.

It is preferable that the processing unit accepts a registration request for a delivery destination of time-series information stored in the stream database from one of the in-vehicle devices and registers the one of the in-vehicle devices as a delivery destination of the time-series information, and reads time-series information stored in the stream database and delivers read time-series information to the one of the in-vehicle devices registered as a delivery destination.

In the present aspect, the in-vehicle device makes a registration request to the in-vehicle communication device for a delivery destination of the information stored in the stream database, and the in-vehicle communication device having accepted this registration request registers the in-vehicle device being a request source as a delivery destination of the information. The in-vehicle communication device reads the information stored in the stream database and delivers the read information to one or more in-vehicle devices registered as delivery destinations. This allows the in-vehicle communication device to deliver the information stored in the stream database to an appropriate in-vehicle device.

It is preferable that information transmitted and received by the communication unit includes the time-series information and at least one of generation time information of the time-series information, version information on a communication protocol, information identifying a device that generates the time-series information, route information on a route passed through in communication and security information for preventing the time-series information from being tampered.

In the present aspect, the information transmitted and received between the in-vehicle communication device and the in-vehicle device includes the time-series information stored in the stream database and at least one of the generation time information of the time-series information, version information on a communication protocol, identifying information of a device that generates the information, route information on a route passed through in communication and security information for preventing the information from being tampered. By containing such information, the in-vehicle communication system including the in-vehicle communication device and the in-vehicle devices is expected to transmit and receive information complying with the communication protocol for service-oriented communication.

It is preferable that the processing unit transmits time-series information stored in the stream database to another in-vehicle communication device that is connected to the plurality of in-vehicle devices through individual communication lines.

In the present aspect, another in-vehicle communication device is provided separately from the above-mentioned in-vehicle communication device within the vehicle. Said another in-vehicle communication device is connected, through individual communication lines, to the plurality of in-vehicle devices that are connected to the in-vehicle communication device. The in-vehicle communication device transmits information stored in the stream database to said another in-vehicle communication device. Thus, said another in-vehicle communication device having received the information from the in-vehicle communication device can store the received information in its own stream database and can deliver the information if the in-vehicle communication device can no longer deliver the information for some reason.

It is preferable that the processing unit receives time-series information transmitted from another in-vehicle communication device connected to the plurality of in-vehicle devices through individual communication lines and stores the time-series information in the stream database, and delivers time-series information stored in the stream database to the in-vehicle devices in a case where an abnormality is detected in said another in-vehicle communication device.

In the present aspect, the in vehicle communication device receives the information transmitted from said another in-vehicle communication device and stores it in the stream database. If detecting an abnormality in said another in-vehicle communication device, the in-vehicle communication device delivers the information stored in the stream database to the one or more in-vehicle devices. Thus, the in-vehicle communication device can create, in its own stream database, a backup copy of the information stored in the stream database of said another in-vehicle communication device, and, if said another in-vehicle communication device can no longer deliver information for some reason, can deliver the information.

An in-vehicle relay device according to the present aspect comprises a first communication unit that is connected to an in-vehicle communication device through a first communication line and communicates in compliance with a first communication protocol for service-oriented communication; a second communication unit that is connected to one or a plurality of in-vehicle control devices through a second communication line and communicates in compliance with a second communication protocol different from the first communication protocol; and a processing unit that performs processing of relaying communication between the in-vehicle communication device and the one or a plurality of in-vehicle control devices, and the processing unit receives time-series information delivered from the in-vehicle communication device by the first communication unit and transmits the time-series information received to the one or a plurality of in-vehicle control devices by the second communication unit, and receives time-series information transmitted from the one or a plurality of in-vehicle control devices by the second communication unit and transmits the time-series information received from the first communication unit to the in-vehicle communication device, to store the time-series information in a stream database contained in the in-vehicle communication device.

In the present aspect, the in-vehicle relay device is connected to the in-vehicle communication device through the first communication line and is connected to one or more of the in-vehicle control devices through the second communication line. The in-vehicle relay device communicates with the in-vehicle communication device in compliance with the first communication protocol for service-oriented communication and communicates with the in-vehicle control devices in compliance with the second communication protocol different from the first communication protocol. The in-vehicle relay device receives the information transmitted from the in-vehicle communication device and transmits it to the in-vehicle control devices. The in-vehicle relay device receives the information transmitted from the in-vehicle control devices and transmits it to the in-vehicle communication device, to thereby store the information received from the in-vehicle control devices in the stream database of the in-vehicle communication device. This can anticipate achievement of the in-vehicle communication system provided with various kinds of communication protocols including the service-oriented communication, as well as contribution to introduction of the service-oriented communication into in-vehicle communication.

It is preferable that the processing unit requests the in-vehicle communication device to register a delivery destination of time-series information stored in the stream database of the in-vehicle communication device.

In the present aspect, the in-vehicle relay device makes a registration request to the in-vehicle communication device for the delivery destination of the information stored in the stream database of the in-vehicle communication device. Thus, the in-vehicle relay device can register, in the in vehicle communication device, the delivery destination of the information required by one or more in-vehicle control devices connected to its own device and acquire the necessary information from the in-vehicle communication device and transmit it to the in-vehicle control devices.

It is preferable that the in-vehicle relay device comprises a plurality of the first communication units, and the plurality of first communication units include a first communication unit connected to a first in-vehicle communication device and a first communication unit connected to a second in-vehicle communication device, and the processing unit transmits and receives time-series information to and from the first in-vehicle communication device, and transmits and receives time-series information to and from the second in-vehicle communication device in a case where an abnormality of the first in-vehicle communication device is detected.

In the present aspect, the in-vehicle relay device is connected to the first in-vehicle communication device and the second in-vehicle communication device to thereby communicate with both of the in-vehicle communication devices. The in-vehicle relay device normally transmits and receives information to and from the first in-vehicle communication device, and transmits and receives information with the second in-vehicle communication device if an abnormality is detected in the first in-vehicle communication device. This allows the in-vehicle relay device to continuously perform the processing using the second in-vehicle communication device even if any abnormality occurs in the first in-vehicle communication device.

It is preferable that the in-vehicle relay device comprises a plurality of the second communication units, and the plurality of second communication units include a second communication unit connected to the in-vehicle control device through a communication line and a second communication unit connected to another communication line to which another in-vehicle relay device and another in-vehicle control device are connected, and the processing unit transmits and receives time-series information to and from said another in-vehicle control device in a case where an abnormality is detected in said another in-vehicle relay device.

In the present aspect, the in vehicle relay device is connected to the one or more in-vehicle control devices that are connected to another in-vehicle relay device through a communication line to thereby communicate with the in-vehicle control devices with which said another in-vehicle relay device relays the communication. If detecting an abnormality in said another in-vehicle relay device, the in-vehicle relay device transmits and receives information to and from the one or more in-vehicle control devices connected to said another in-vehicle relay device. This allows the in-vehicle relay device to communicate with the in-vehicle control devices in place of said another in-vehicle relay device even if any abnormality occurs in said another in-vehicle relay device.

An in-vehicle communication system according to the present aspect comprises an in-vehicle communication device that has a stream database storing received time-series information; and a plurality of in-vehicle relay devices connected to the in-vehicle communication device through individual first communication lines, each in-vehicle relay device being connected to a plurality of in-vehicle control devices through a second communication line, and the in-vehicle communication device and the in-vehicle relay device communicate with each other in compliance with a first communication protocol for service-oriented communication, the in-vehicle relay device and the in-vehicle control devices communicate with each other in compliance with a second communication protocol different from the first communication protocol, the in-vehicle communication device stores time-series information received from the in-vehicle relay device in the stream database and delivers time-series information stored in the stream database to the in-vehicle relay device, and the in-vehicle relay device receives time-series information delivered from the in-vehicle communication device and delivers the time-series information to the in-vehicle control devices, and receives time-series information transmitted from the in-vehicle control devices and transmits the time-series information to the in-vehicle communication device, to store the time-series information in the stream database.

As in the aspects (1) and (6), the present aspect can anticipate contribution to introduction of the service-oriented communication into in-vehicle communication.

A communication method according to the present aspect causing an in-vehicle communication device connected to a plurality of in-vehicle devices through individual communication lines to execute processing of: communicating with the in vehicle devices through the communication lines in compliance a communication protocol for service-oriented communication; storing time-series information received from the in-vehicle devices in a stream database; and delivering time-series information stored in the stream database to the in-vehicle devices.

As in the aspect (1), the present aspect can anticipate contribution to introduction of the service-oriented communication into in-vehicle communication.

A communication method according to the present aspect causing an in-vehicle relay device connected to an in-vehicle communication device through a first communication line and connected to one or a plurality of in-vehicle control devices through a second communication line to execute the processing of: communicating with the in-vehicle communication device in compliance with a first communication protocol for service-oriented communication; communicating with the one or a plurality of in vehicle control devices in compliance with a second communication protocol different from the first communication protocol; receiving time-series information delivered from the in-vehicle communication device and transmitting the time-series information to the one or a plurality of in-vehicle control devices, and receiving time-series information transmitted from the one or a plurality of in-vehicle control devices and transmitting the time-series information to the in-vehicle communication device, to store the time-series information in a stream database contained in the in-vehicle communication device.

As in the aspect (6), the present aspect can anticipate contribution to introduction of the service-oriented communication into in-vehicle communication.

Specific examples of an in-vehicle communication system according to the embodiments of the present disclosure will be described below with reference to the drawings. The present disclosure is not limited to these examples and is defined by the appended claims, and all changes that fall within the meanings and the bounds of the claims, or equivalence of such meanings and bounds are intended to be embraced by the claims.

FIG. 1 is a schematic diagram illustrating an overview of an in-vehicle communication system according to a first embodiment. The in-vehicle communication system according to the present embodiment is a system in which various devices such as an integrated ECU (in-vehicle communication device) 1, a relay ECU (in-vehicle relay device) 3 and an ECU (in-vehicle control device) 5, which are mounted on a vehicle 100, transmit and receive messages on an in-vehicle network. In the present embodiment, the vehicle 100 is mounted with one integrated ECU 1, and the integrated ECU 1 is connected with multiple relay ECUs 3 (three in the present example) through individual communication lines. The integrated ECU 1 and the multiple relay ECUs 3 are connected in a so-called star network configuration and transmit and receive messages in compliance with the Ethernet (registered trademark) communication protocol.

Multiple ECUs 5 (three in the present example) are connected to each of the relay ECUs 3 through a common communication line. Each relay ECU 3 and the multiple ECUs 5 are connected in a so-called bus network configuration, and transmit and receive messages in compliance with the CAN (Controller Area Network) communication protocol. The in-vehicle communication system according to the present embodiment is a system provided with communications complying with the Ethernet communication protocol and communications complying with the CAN communication protocol. The integrated ECU 1 is located at an appropriate position in the vehicle 100. The relay ECUs 3 are located in respective areas, for example, front and back, right and left of the vehicle 100 and are connected to the integrated ECU 1 through individual communication lines. The multiple ECUs 5 are located at appropriate locations in the vehicle 100 and are connected to the nearest relay ECU 3 through a CAN bus.

In recent years, employing service-oriented communication, that is, SOME/IP communication protocol has been proposed for in-vehicle communication. The SOME/IP communication protocol is a communication protocol designed based on a service-oriented architecture and is a communication protocol at the upper layer of the Ethernet. In the conventional CAN communication protocol, broadcast or multicast communication is performed while in the SOME/IP communication protocol, client-server communication is performed. Thus, in the case where communication as in the SOME/IP communication protocol is intended to be performed on the CAN communication protocol, each communication node has to work as both of a client and a server, so that decrease in communication efficiency may occur.

Hence, in the in-vehicle communication system according to the present embodiment, the communication network within the vehicle 100 is separated into multiple layers including a layer where the integrated ECU 1 and the relay ECU 3 perform Ethernet communication and a layer where the relay ECU 3 and the ECU 5 perform CAN communication. The SOME/IP communication protocol is employed for communication between the integrated ECU 1 and the relay ECU 3. In contrast thereto, in the in-vehicle communication system according to the present embodiment, the CAN communication protocol is employed for communication between the relay ECU 3 and the ECU 5. Adopting such a hierarchical structure allows the in-vehicle communication system according to the present embodiment to apply the SOME/IP communication protocol to the system provided with different communication protocols such as Ethernet and CAN.

In the in-vehicle communication system according to the present embodiment, the integrated ECU 1 centrally manages various information transmitted and received among the devices in the vehicle 100. The integrated ECU 1 has thus a stream database (referred to simply as DB in FIG. 1) for storing these various types of information. The stream database stores time-series information and sequentially processes the stored information in time series. In the in-vehicle communication system according to the present embodiment, for example, information on speed generated by each ECU 5, information on engine revolution number and the like are dealt as time-series information according to the order in which they are generated.

In the in-vehicle communication system according to the present embodiment, each relay ECU 3 acquires time-series information generated by the ECUs 5 and transmits it to the integrated ECU 1, which allows the integrated ECU 1 to store the time-series information in the stream database. The integrated ECU 1 reads in time series the information stored in the stream database and delivers the read time-series information to the ECU 5 (to the relay ECU 3 to which the ECU 5 that needs the information is connected) that needs this information. Thus, the in-vehicle communication system according to the present embodiment can perform service-oriented communication regarding the integrated ECU 1 that stores and delivers time-series information as a server and the relay ECUs 3 and the ECUs 5 that receive time-series information as clients.

Figure 2:
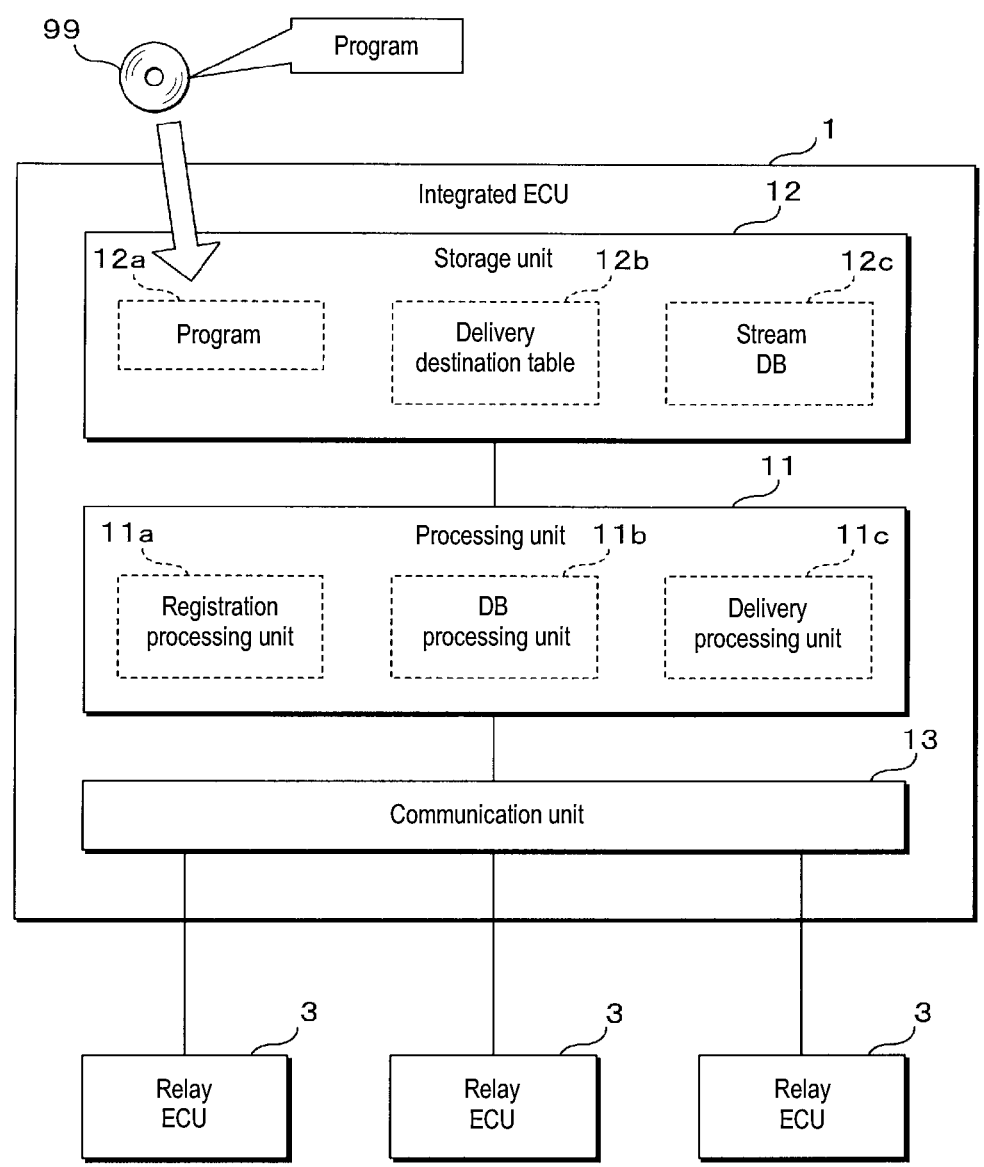
FIG. 2 is a block diagram illustrating the configuration of an integrated ECU according to the first embodiment.

FIG. 2 is a block diagram illustrating the configuration of the integrated ECU 1 according to the first embodiment. The integrated ECU 1 according to the present embodiment is composed of a processing unit (processor) 11, a storage unit (storage) 12 and a communication unit (transceiver) 13 and the like. The processing unit 11 is composed of an arithmetic processing unit such as a CPU (Central Processing Unit), an MPU (Micro-Processing Unit) or the like. The processing unit 11 reads and executes the program 12a stored in the storage unit 12 to thereby perform various processing such as storing the information received from the relay ECU 3 and delivering stored information to the relay ECU 3.

The storage unit 12 is configured by using, for example, a nonvolatile memory element such as a flash memory, an electrically erasable programmable read only memory (EE-PROM) or the like. The storage unit 12 stores various programs to be executed by the processing unit 11 and various data required for the processing by the processing unit 11. In the present embodiment, the storage unit 12 stores the program 12a to be executed by the processing unit 11, and has a delivery destination table 12b registering information related to a delivery destination to which stored information is to be delivered and a stream DB (database) 12c soring time-series information.

The program (program product) 12a may be written into the storage unit 12, for example, at the manufacturing stage of the ECU 1. The program 12a delivered by a remote server device or the like may be acquired by the integrated ECU 1 through communication, for example. The program 12a recorded in a recording medium 99 such as a memory card, an optical disk or the like may be read out and stored in the storage unit 12 by the ECU 1, for example. The program 12a recorded in the recording medium 99 may be read out and written into the storage unit 12 of the integrated ECU 1 by a writing device, for example. The program 12a may be provided in the form of distribution through a network or may be provided in such a manner as to be recorded in the recording medium 99.

FIG. 3 is a schematic diagram illustrating the configuration of a delivery destination table 12b. The delivery destination table 12b according to the present embodiment is a table storing, for example, the identification information of the device as a delivery destination of the information in association with the type of information to be delivered to this device. In the present example, the table stores delivery of information such as a vehicle speed, an engine revolution number, a steering angle and the like to the delivery destination with the identification information of the relay ECU_A. Further stored is delivery of information such as a steering angle, a shift position and the like to the delivery destination with the identification information of the relay ECU_B. Further stored is delivery of information such as position information, a vehicle speed and the like to the delivery destination with the identification information of the relay ECU_C. The integrated ECU 1 accepts a registration request from the relay ECU 3 when the in-vehicle communication system starts up, for example, decides the type of information to be delivered according to the received request and stores the identification information of the relay ECU 3 as a request source in association with the type of information to be delivered in the delivery destination table 12b.

In a system that needs to make a registration request to the integrated ECU 1, such as the in-vehicle communication system according to the present embodiment, information is not delivered from the integrated ECU 1 to an ECU or the like which has not made a registration request. In addition, in the case where there is an ECU or the like for which the registration request cannot be accepted for some reason, the integrated ECU 1 may store, as abnormal information related to the registration, information such as the identification information of the ECU that made the registration request, the time when the registration request failed, and the details of the registration request.

Though the in-vehicle communication system according to the present embodiment needs a registration request to the integrated ECU 1, there is no need to be limited to this configuration. The in-vehicle communication system may be configured so as not to need a registration request. In this case, by storing the delivery destination table 12b in which information on delivery destination and delivery information are set in advance, the integrated ECU 1 continuously delivers information according to the information set in this delivery destination table 12b.

Figure 4:
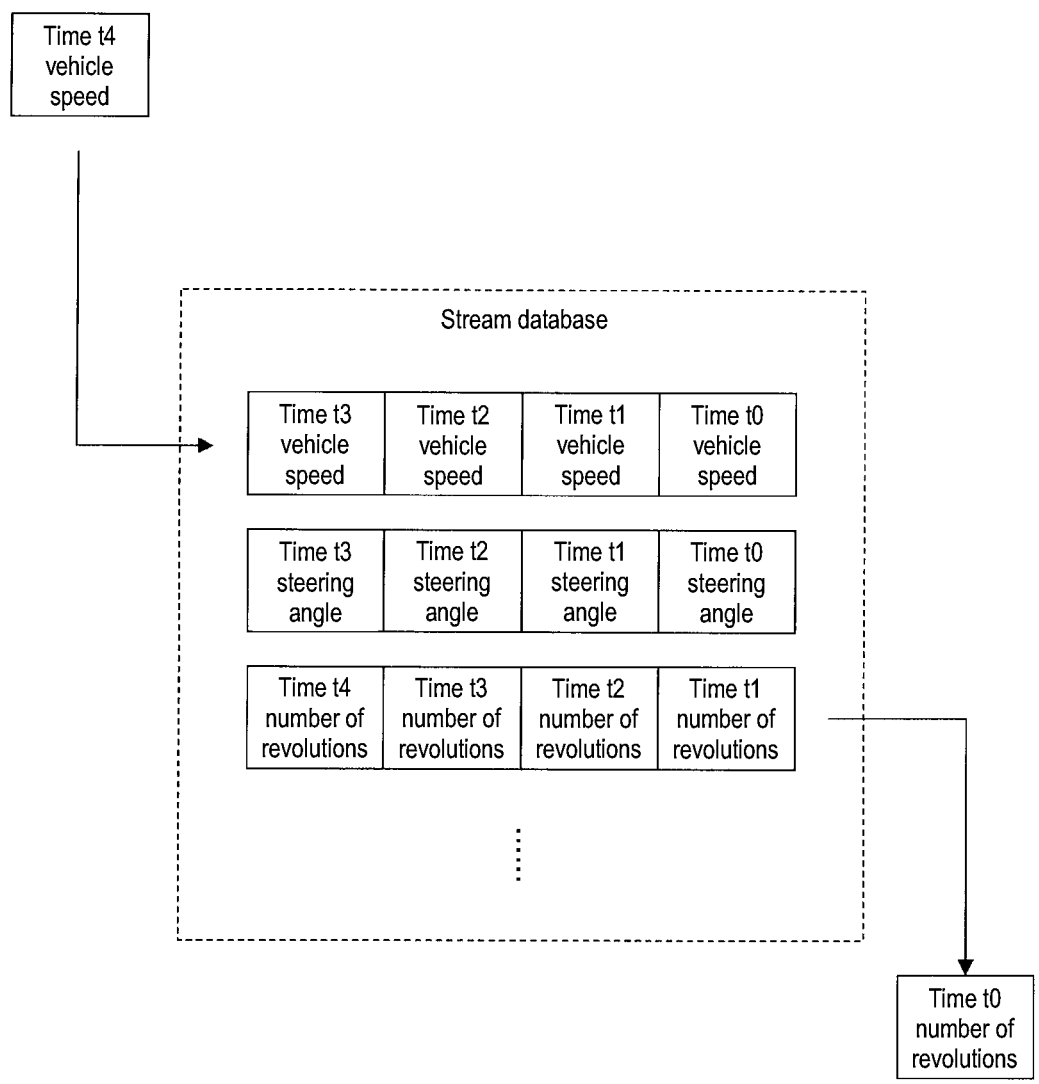
FIG. 4 is a schematic diagram illustrating the configuration of a stream DB (database).

FIG. 4 is a schematic diagram illustrating the configuration of the stream DB 12c. This drawing shows an example where the stream DB 12c stores information such as a vehicle speed, a steering angle and the number of revolutions as time-series information generated in the vehicle 100. The stream DB 12c stores, in time series for each type of information, time-series information contained in a message received by the integrated ECU 1. Each information is stored in the stream DB 12c in a so-called FIFO (First-in First-Out) format. The stream DB 12c stores in time series, for example, the vehicle speed at time t0, the vehicle speed at time t1, the vehicle speed at time t2 and the vehicle speed at time t3 in this order. If newly storing the vehicle speed information at time t4, the stream DB 12c adds and stores the vehicle speed information at time t4 after the vehicle speed information at the latest time t3 out of the stored information. The stream DB 12c stores in time series, for example, the number of revolutions at time t0, the number of revolutions at time t1, the number of revolutions at time t2, the number of revolutions at time t3 and the number of revolutions at time t4 in this order. If reading information on the number of revolutions, the stream DB 12c reads the information on the number of revolutions at the oldest time t0.

If reading and delivering information from the stream DB 12c, the integrated ECU 1 may read and deliver one piece of information at a time, or may read multiple pieces of information at a time and deliver the multiple pieces of information at once. For example, the integrated ECU 1 can read the vehicle speed information at times t0 to t4 from the stream DB 12c, include the five pieces of vehicle speed information in a single message and deliver this information to the ECU or the like that requires this information.

In addition, the integrated ECU 1 may read multiple pieces of information from the stream DB 12c, perform arithmetic operation on the multiple pieces of information and deliver the result of the arithmetic operation. For example, the integrated ECU 1 can read the vehicle speed information at times t0 to t4 from the stream DB 12c, calculate the maximum value, minimum value, average value or the like of the five vehicle speeds and deliver a message containing the calculated values. Even if reading only one piece of information from the stream DB 12c, the integrated ECU 1 may perform arithmetic operation on the read one piece of information.

The number of information to be read from the stream DB 12c by the integrated ECU 1, the arithmetic operation for the read information and the like may be designated by the ECU that needs this information in making a registration request, for example. The number of information to be read, the arithmetic operation and the like may be determined for each type of information at the design stage or the like of the in-vehicle communication system.

If there are two ECUs that request delivery of vehicle speed information, for example, the integrated ECU 1 may deliver information different in the number of information and the arithmetic operation for each delivery destination, for example, may deliver the average value of three vehicle speeds to a first ECU and may deliver the maximum value of five vehicle speeds to a second ECU.

In the present embodiment, the information read from the stream DB 12*c* is to be discarded (deleted from the storage area) though the way is not limited to deletion. For example, the information may be stored in the stream DB 12*c* until a predetermined time has elapsed from the time when the information is generated, or may continue to be stored without being discarded. In the case where the read information is not discarded, the stream DB 12*c* manages the information so as to grasp the last information that has been read in time series. The delivery destination table 12*b* and the stream DB 12*c* may be stored in a storage unit composed of volatile memory elements such as a DRAM (Dynamic Random Access Memory) or an SRAM (Static Random Access Memory), not in the storage unit 12 composed of non-volatile memory elements.

The communication unit 13 performs wired communication in compliance with the Ethernet communication protocol. The communication unit 13 can be configured using an integrated circuit (IC) of an Ethernet switch, for example. The communication unit 13 is connected to the relay ECUs 3 through individual communication lines disposed in the vehicle 100 and performs one-to-one communication with each of the relay ECUs 3 in compliance with the Ethernet communication protocol. The communication unit 13 performs message transmission to the relay ECU 3 by converting a message for transmission provided from the processing unit 11 into an electrical signal complying with the Ethernet communication protocol and outputting the electrical signal onto the communication line. The communication unit 13 receives a message from the relay ECU 3 by acquiring the potential of the communication line by sampling and provides the processing unit 11 with the received message.

In the integrated ECU 1 according to the present embodiment, the processing unit 11 reads and executes the program 12*a* stored in the storage unit 12 to thereby implement a registration processing unit 11*a*, a DB processing unit 11*b* and a delivery processing unit 11*c* as functional parts in software. The registration processing unit 11*a* performs processing of registering the delivery destination of the information stored in the stream DB 12*c*. For example, if the ignition switch of the vehicle 100 is switched from the off state to the on state to start up the in-vehicle communication system, the registration processing unit 11*a* reports information on the service it offers to the respective relay ECUs 3 connected to the communication unit 13 and acquires a registration request for the delivery destination of the information from each of the relay ECUs 3. Each of the relay ECUs 3 transmits, to the integrated ECU 1, a registration request for the delivery destination including the identification information attached thereto and information such as the type of information requested to be delivered. The registration processing unit 11*a* of the integrated ECU 1 receives the request from each of the relay ECUs 3 and registers the delivery destination and the delivery information in the delivery destination table 12*b* of the storage unit 12 based on the information contained in the received request. The registration of delivery destinations in the in-vehicle communication system can be performed in a procedure complying with the SOME/IP-SD communication protocol, for example.

The DB processing unit 11*b* performs processing such as storing and reading information into and from the stream DB 12*c*. The DB processing unit 11*b* acquires time-series information contained in the received message as well as adds and stores the acquired time-series information at the trailing end (after the latest information) of the same type of information stored in the stream DB 12*c* in time series. If reading information from the stream DB12*c*, the DB processing unit 11*b* determines the type of information as a target to be read and reads the first (oldest) information from the same type of information stored in time series.

The delivery processing unit 11*c* performs processing of delivering the information stored in the stream DB12*c* to the one or more relay ECUs 3. In the in-vehicle communication system according to the present embodiment, the delivery cycle is defined for each type of information, for example. The delivery processing unit 11*c* acquires information from the stream DB 12*c* at a predetermined cycle and creates a message containing the acquired information. The delivery processing unit 11*c* transmits the created message to the one or more relay ECUs 3 that have been registered in the delivery destination table 12*b* as delivery destinations of this information. The message delivered from integrated ECU 1 to the relay ECUs 3 may contain multiple information read from the stream DB 12*c*. The delivery cycle may be defined for each type of delivery destination, not type of information, for example. If receiving a request for transmission of information from the relay ECU 3 aside the defined cycle, for example, the delivery processing unit 11*c* may acquire the requested information from the stream DB 12*c* and transmit it to the relay ECU 3 as a requesting source.

Figure 5:
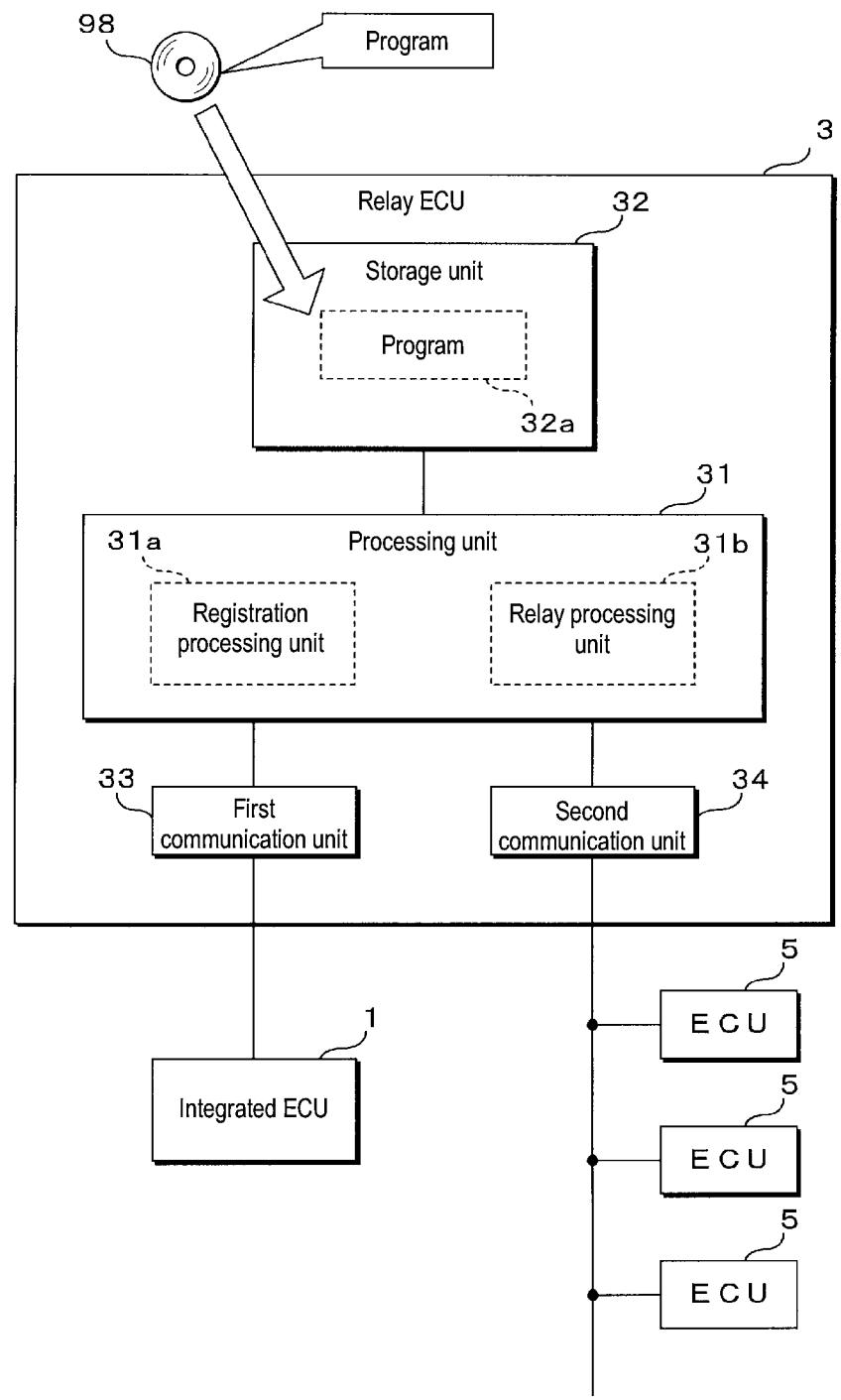
FIG. 5 is a block diagram illustrating the configuration of a relay ECU according to the first embodiment.

FIG. 5 is a block diagram illustrating the configuration of the relay ECU 3 according to the first embodiment. The relay ECU 3 according to the present embodiment is composed of a processing unit (processor) 31, a storage unit (storage) 32, a first communication unit (transceiver) 33, a second communication unit (transceiver) 34 and the like. The processing unit 31 is composed of an arithmetic processing device such as a CPU, MPU or the like. The processing unit 31 reads and executes the program 32*a* stored in the storage unit 32 to thereby perform various processing such as processing of requesting the integrated ECU 1 to register the delivery destination and processing of relaying messages between the integrated ECU 1 and the ECUs 5.

The storage unit 32 is configured by using, for example, a nonvolatile memory element such as a flash memory, an electrically erasable programmable read only memory (EEPROM) or the like. The storage unit 32 according to the present embodiment stores a program 32*a* to be executed by the processing unit 31. The program (program product) 32*a* may be written into the storage unit 32, for example, at the manufacturing stage of the relay ECU 3. The program 32*a* which is delivered by a remote server device or the like may be acquired by the relay ECU 3 through communication, for example. The program 32*a* recorded in a recording medium 98 such as a memory card, an optical disk or the like may be read and stored in the storage unit 32 by the relay ECU 3, for example. The program recorded in the recording medium 98 may be read out and written into the storage unit 32 of the relay ECU 3, by a writing device, for example. The program 32*a* may be provided in the form of distribution over a network or may be provided in such a manner as to be recorded in the recording medium 98.

The first communication unit 33 performs wired communication complying with the Ethernet communication protocol and can be configured using an IC of an Ethernet switch, for example. The first communication unit 33 is connected to the integrated ECU 1 through an individual communication line placed in the vehicle 100, and performs one-to-one communication with the integrated ECU 1 in compliance with the Ethernet communication protocol. The first communication unit 33 performs message transmission to the integrated ECU 1 by converting a message for transmission provided from the processing unit 31 into an electrical signal complying with the Ethernet communication protocol and outputting the electrical signal onto the communication line. The first communication unit 33 receives a message from the integrated ECU 1 by acquiring the potential of the communication line by sampling and provides the processing unit 31 with the received message.

The second communication unit 34 performs wired communication complying with the CAN communication protocol and can be configured using an IC for a CAN controller, for example. The second communication unit 34 is connected to the multiple ECUs 5 through a CAN bus placed in the vehicle 100 and communicates with the ECUs 5 in compliance with the CAN communication protocol. The second communication unit 34 performs message transmission to the ECUs 5 by converting a message for transmission provided from the processing unit 31 into an electrical signal complying with the CAN communication protocol and outputting the electrical signal onto the CAN bus. The second communication unit 34 receives a message from each of the ECUs 5 by acquiring the potential of the CAN bus by sampling and provides the processing unit 31 with the received message. The second communication unit 34 performs arbitration processing of arbitrating the transmission order of messages if a collision occurs in the transmission of messages onto the CAN bus.

In the relay ECU 3 according to the present embodiment, the processing unit 31 reads and executes the program 32a stored in the storage unit 32 to thereby implement a registration processing unit 31a, a relay processing unit 31b and the like as functional parts in software. The registration processing unit 31a performs processing of requesting the integrated ECU 1 to register the delivery destination of the information. For example, after start-up of the in-vehicle communication system, the integrated ECU 1 transmits information or the like it offers to each relay ECU 3 and accepts a registration request for the delivery destination of information from each relay ECU 3. The registration processing unit 31a of each relay ECU 3 having received the information from the integrated ECU 1 transmits, to the integrated ECU 1, a registration request for the delivery destination of information including the identifier attached to its own device and the type of information that its own device requires. Here, the type of information required by its own device is the information required by the one or more ECUs 5 connected to the relay ECU 3. The relay ECU 3 has stored the types of information required by the ECUs 5 in the storage unit 32 in advance, for example, which allows the registration processing unit 31a to perform a registration request based on this information. Alternatively, at a start-up of the in-vehicle communication system, for example, the registration processing unit 31a may communicate with each ECU 5 to acquire information as to the type of information it requires.

The relay processing unit 31b performs processing of relaying messages between the integrated ECU 1 and the one or more ECUs 5. The relay processing unit 31b receives a message delivered from the integrated ECU 1 through the first communication unit 33, acquires time-series information contained in the received message, generates a CAN message containing the acquired information and transmits it through the second communication unit 34. The relay processing unit 31b receives a message to be transmitted by the ECU 5 through the second communication unit 34, acquires time-series information contained in the received message, generates an Ethernet (or SOME/IP) message containing the acquired information and transmits the message from the first communication unit 33. The relay processing unit 31b may divide a message received from one side into multiple messages and relay it to the other side, or combine multiple messages received from one side into a single message and relay it to the other side.

Figure 6:
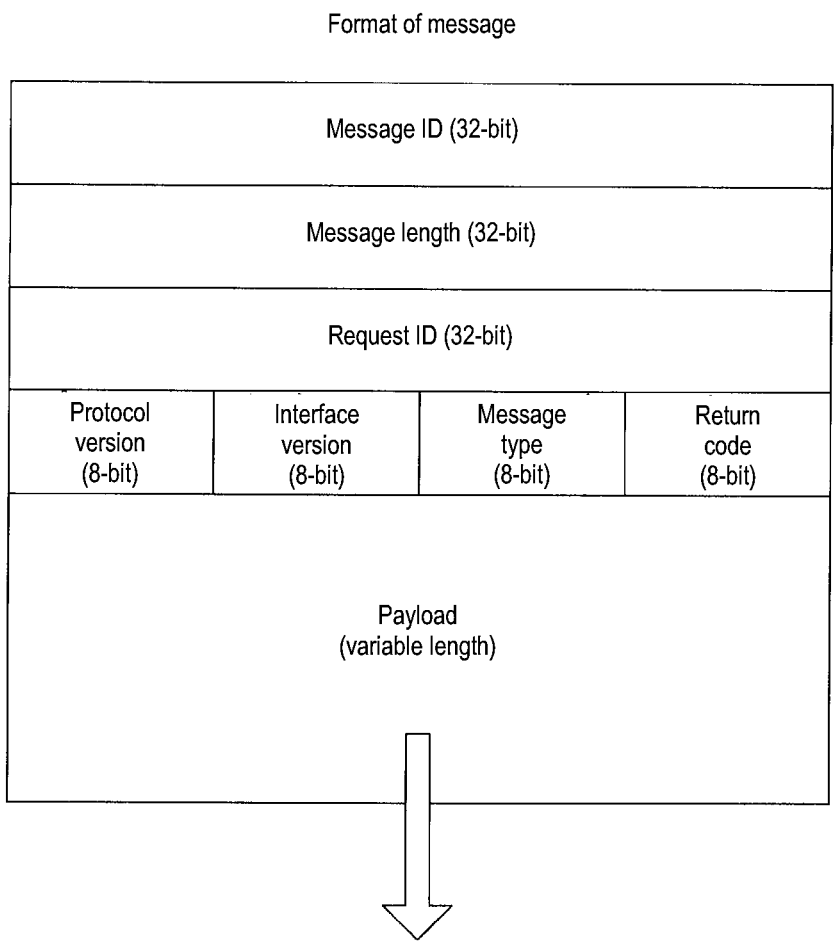
FIG. 6 is a schematic diagram illustrating the format of a message that is transmitted and received between the integrated ECU and the relay ECU 3 according to the first embodiment.

In the in-vehicle communication system according to the present embodiment, messages are transmitted and received between the one or more ECUs 5 and the relay ECU 3 in compliance with the CAN communication protocol while messages are transmitted and received between the one or more relay ECUs 3 and the integrated ECU 1 in compliance with the SOME/IP communication protocol. FIG. 6 is a schematic diagram illustrating the format of a message that is transmitted and received between the integrated ECU 1 and the relay ECU 3 according to the first embodiment. In the in-vehicle communication system according to the present embodiment, the integrated ECU 1 and the relay ECU 3 transmit and receive messages in compliance with the SOME/IP communication protocol. This message contains information storage areas including a 32-bit message ID, a 32-bit message length, a 32-bit request ID, an 8-bit protocol version, an 8-bit interface version, an 8-bit message type, an 8-bit return code and a payload of variable length.

The message ID is identification information indicating the type of a message, and is determined in advance by the system designer or the like, as in the CAN-ID used in the CAN communication protocol, for example. The message length is numerical information in bits or bytes indicating the overall length of this message. The request ID is identification information attached to a device having requested for the delivery of the information contained in this message. The protocol version and the interface version are respectively version information on the protocol and interface of the SOME/IP communication protocol used by the devices that transmit and receive messages. The message type is identification information indicating the type of information contained in this message. The return code is used to report whether or not some request is normally processed, and is set with one of some codes indicting normal termination, abnormal termination, and the like. The information on the message ID to the return code contained in the message is information defined in the SOME/IP communication protocol.

The payload is an area storing one or more time-series information to be stored or stored in the stream DB 12c. In the in-vehicle communication system according to the present embodiment, the payload of a message stores information such as generation time information, node number, route information and security information along with the time-series information. The generation time information indicates the time at which time-series information was generated (or the time at which the relay ECU 3 received a message containing this information from the ECU 5 that had generated the time-series information). Each device in the in-vehicle communication system can determine the order in time series of information based on this generation time. The node number is identification information of a node (device) that generated this message, or identification information of the node that generated the information contained in this message. The route information is information indicating which communication route this message passed through and received. For example, the identification information of one or more nodes that transmit and received this message is stored in order. The security information is information to prevent messages from being tampered or the like, such as error detection code, error correction code, authentication code or the like.

In the in-vehicle communication system according to the present embodiment, the integrated ECU 1 and the relay ECU 3 generate and transmit messages in the format as illustrated in FIG. 6. Here, messages transmitted from the integrated ECU 1 to the relay ECU 3 may be in the format illustrated in FIG. 6 while messages transmitted from the relay ECU 3 to the integrated ECU 1 may be in a different format. The node number, route information, security information and the like need not be included in the payload of a message.

In the in-vehicle communication system according to the present embodiment, after the ignition switch is turned from the off state to the on state and the devices in the in-vehicle communication system are supplied with power and start up, the integrated ECU 1 first performs registration processing of registering a delivery destination to which information is to be delivered in the delivery destination table 21*b*. Note that the registration processing may be performed when the in-vehicle communication system is first started, not every time the in-vehicle communication system is started, to store the delivery destination table 12*b* which is to be used repeatedly by the integrated ECU 1 for subsequent information delivery.

Figure 7:
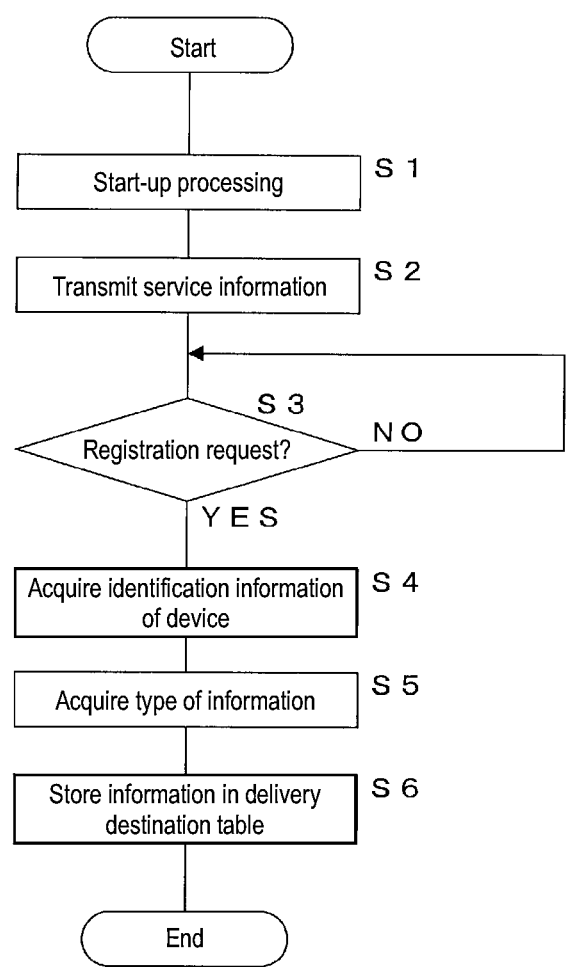
FIG. 7 is a flowchart of a registration processing procedure performed by the integrated ECU according to the first embodiment.

FIG. 7 is a flowchart of a registration processing procedure performed by the integrated ECU 1 according to the first embodiment. After an ignition switch of the vehicle 100 is switched from the off state to the on state, for example, to supply power from a battery or the like, the processing unit 11 of the integrated ECU 1 according to the present embodiment performs start-up processing including processing such as initialization or the like of the components (step S1). After completion of the start-up processing, the registration processing unit 11*a* of the processing unit 11 transmits service information including various information related to services offered by its own device to the relay ECUs 3 that is connected to the communication unit 13 through the individual communication lines (step S2).

The registration processing unit 11*a* determines whether or not a registration request message transmitted from any of the relay ECUs 3 having received the transmission of the service information is received (step S3). If not receiving a registration request message from the relay ECU 3 (S3: NO), the registration processing unit 11*a* is placed in a standby condition until it receives a registration request message. If receiving the registration request message (S3: YES), the registration processing unit 11*a* acquires the identification information of the device as a transmission source contained in the received registration request message (step S4). The registration processing unit 11*a* acquires the type of information requested to be delivered that is contained in the received registration request message (step S5). The registration processing unit 11*a* stores the identification information acquired at step S4 in association with the type of information acquired at step S5 in the delivery destination table 12*b* of the storage unit 12 (step S6) and ends the processing.

Figure 8:
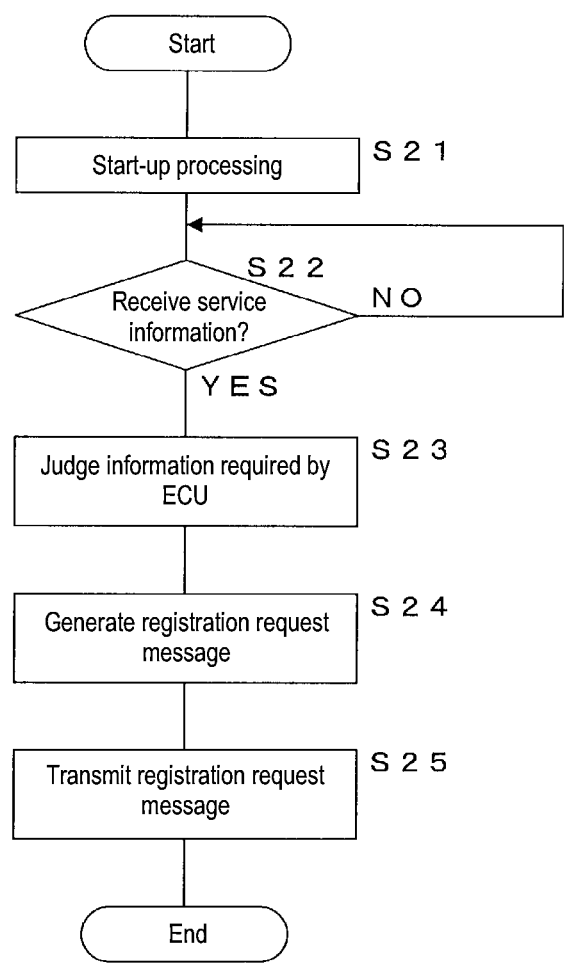
FIG. 8 is a flowchart of a registration processing procedure performed by the relay ECU according to the first embodiment.

FIG. 8 is a flowchart of a registration processing procedure performed by the relay ECU 3 according to the first embodiment. After an ignition switch of the vehicle 100 is turned from an off state to an on state, for example, to supply power from a battery or the like, the processing unit 31 of the relay ECU 3 according to the present embodiment performs start-up processing including processing such as initialization or the like of the components (step S21). After completion of the start-up processing, the registration processing unit 31*a* of the processing unit 31 determines whether or not the service information transmitted by the integrated ECU 1 is received through the first communication unit 33 (step S22). If not receiving the service information from the integrated ECU 1 (S22:NO), the registration processing unit 31*a* is placed in a standby condition until it receives the service information.

If receiving the service information from the integrated ECU 1 (S22: YES), the registration processing unit 31*a* judges the information required by the one or more ECUs 5 connected to the second communication unit 34 through the CAN bus (step S23). The registration processing unit 31*a* may here judge the information required by each ECU 5 by reading the information stored in advance, or inquiring of the ECU 5 about required information and obtaining the reply, for example. The registration processing unit 31*a* generates a registration request message containing information such as the type of information that is judged to be required by the ECU 5 at step S23, identification information attached to its own device and the like (step S24). The registration processing unit 31*a* transmits the generated registration request message from the first communication unit 33 to the integrated ECU 1 (step S25) and ends the processing.

Though the integrated ECU 1 transmits service information, and in response to the received service information, the relay ECU 3 is configured to make a registration request in FIG. 7 and FIG. 8, the configuration is not limited thereto. After completion of the start-up processing, for example, each relay ECU 3 may voluntarily transmit a registration request message to the integrated ECU 1.

Figure 9:
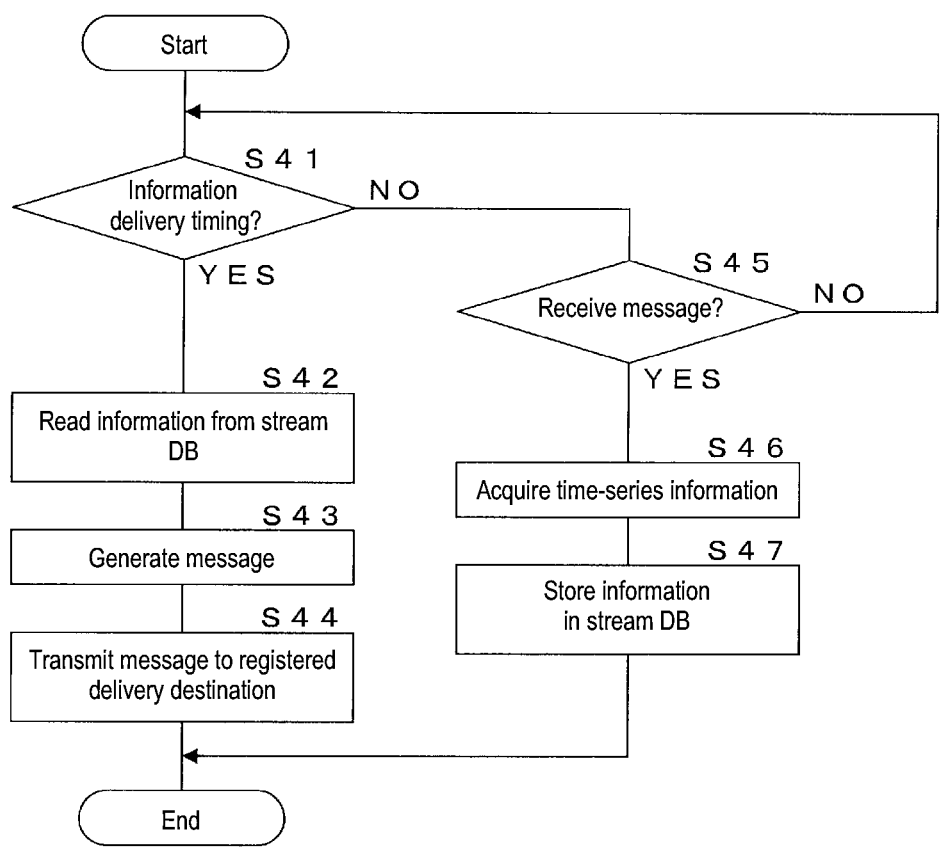
FIG. 9 is a flowchart of a communication processing procedure performed by the integrated ECU according to the first embodiment.

FIG. 9 is a flowchart of a communication processing procedure performed by the integrated ECU 1 according to the first embodiment. The processing unit 11 of the integrated ECU 1 determines whether or not information delivery timing has been reached, for example, in the case where the delivery cycle specified for each type of information has elapsed (step S41). If the information delivery timing has been reached (S41: YES), the DB processing unit 11*b* of the processing unit 11 reads the oldest information of the type to be delivered from the information stored in the stream DB 12*c* of the storage unit 12 (step S42). The DB processing unit 11*b* may here read multiple information from the oldest one in order. The delivery processing unit 11*c* of the processing unit 11 generates a message complying with the SOME/IP communication protocol that contains one or more information read from the stream DB 12*c* at step S42 in the payload and is attached with various information such as a message ID, a message length and the like illustrated in FIG. 6 (step S43). The delivery processing unit 11*c* transmits the message generated at step S43 through the communication unit 13 to the one or more relay ECUs 3 which has been registered as the delivery destination of this information in the delivery destination table 12*b* of the storage unit 12 (step S44) and ends the processing.

If the information delivery timing has not been reached (S41: NO), the processing unit 11 determines whether or not a message from the relay ECU 3 is received (step S45). If not receiving a message from the relay ECU 3 (S45: NO), the processing unit 11 returns the processing to step S41 and is placed in a standby condition until the message delivery timing has been reached, or a message from the relay ECU 3 is received. If receiving a message from the relay ECU 3 (S45: YES), the DB processing unit 11*b* acquires the time series information contained in the received message (step S46). The DB processing unit 11*b* stores the time-series information acquired at step S46 in the stream DB12c (step S47) and ends the processing.

Figure 10:
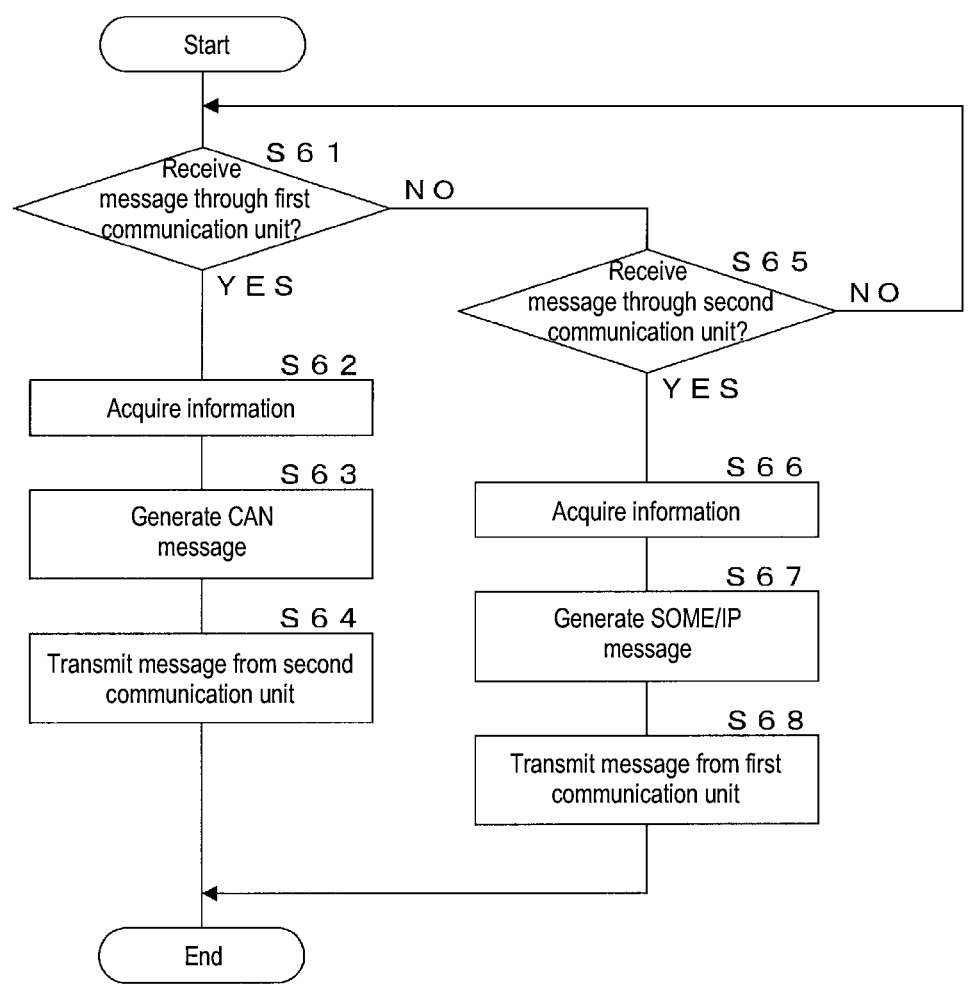
FIG. 10 is a flowchart of a relay processing procedure performed by the relay ECU according to the first embodiment.

FIG. 10 is a flowchart of a relay processing procedure performed by the relay ECU 3 according to the first embodiment. The relay processing unit 31b of the processing unit 31 in the relay ECU 3 according to the present embodiment determines whether or not a message is received from the integrated ECU through the first communication unit 33 (step S61). If receiving a message from the integrated ECU 1 (S61: YES), the relay processing unit 31b acquires necessary time-series information and the like from the message complying with the SOME/IP communication protocol (step S62). The relay processing unit 31b generates a message complying with the CAN communication protocol containing the information acquired at step S62 (step S63). The relay processing unit 31b transmits the message generated at step S63 from the second communication unit 34 to the ECU 5 (step S64) and ends the processing.

If not receiving a message from the integrated ECU 1 (S61: NO), the relay processing unit 31b determines whether or not a message from the ECU 5 is received through the second communication unit 34 (step S65). If not receiving a message from the ECU 5 (S65: NO), the relay processing unit 31b returns the processing to step S61 and is placed in a standby condition until it receives the message from the integrated ECU 1 or the ECU 5. If receiving a message from the ECU 5 (S65: YES), the relay processing unit 31b acquires time-series information and the like from the message complying with the CAN communication protocol (step S66). The relay processing unit 31b generates a message complying with the SOME/IP communication protocol containing the information acquired at step S66 (step S67). The relay processing unit 31b transmits the message generated at step S67 from the first communication unit 33 to the integrated ECU 1 (step S68) and ends the processing.

Though the relay ECU 3 is configured to, every time that it receives information from the integrated ECU 1 or the ECU 5, transmit a message containing the received information to relay the message in FIG. 10, the configuration of the ECU 3 is not limited thereto. For example, if receiving multiple messages to thereby prepare a desired number of messages, the relay ECU 3 may generate and transmit a relay message containing the multiple information. For example, the relay ECU 3 may transmit a relay message at a predetermined cycle. In this case, the relay ECU 3 may store the information contained in the received message until a predetermined period elapses, and may generate and transmit a relay message containing the stored multiple information in the case where the timing for transmitting a relay message has reached after an elapse of the predetermined period.

In the in-vehicle communication system according to the present embodiment with the above-mentioned configuration, the integrated ECU 1 to which the multiple relay ECUs 3 are connected through the individual communication lines communicates with the relay ECUs 3 through these communication lines in compliance with the SOME/IP communication protocol for service-oriented communication. The integrated ECU 1 has the stream DB 12c that stores the time-series information received from the relay ECUs 3, and performs processing of delivering the time series information stored in the stream DB 12c to the one or more relay ECUs 3. This allows the integrated ECU 1 to centrally manage the time-series information within the vehicle 100 and operate as a server that provides time-series information in the service-oriented communication.

In the in-vehicle communication system according to the present embodiment, the relay ECU 3 makes a registration request for the delivery destination of the information stored in the stream DB12c to the integrated ECU 1, while the integrated ECU 1 having accepted the registration request registers the relay ECU 3 of the request source as the delivery destination of the information in the delivery destination table 12b of the storage unit 12. The integrated ECU 1 reads the information stored in the stream DB 12c and delivers the read information to the one or more relay ECUs 3 having been registered as delivery destinations in the delivery destination table 12b. This allows the integrated ECU 1 to deliver the information stored in the stream DB 12c to the appropriate relay ECU 3.

In the in-vehicle communication system according to the present embodiment, messages to be transmitted and received between the integrated ECU 1 and the relay ECU 3 include the time-series information to be stored or stored in the stream DB 12c and at least one of the generation time information of the information, information on protocol version related to the communication protocol and interface version, a node number as identification information of a device that generates information, route information and security information for preventing time depending change. The inclusion of such information allows the in-vehicle communication system containing the integrated ECU 1 and the relay ECU 3 to be expected to transmit and receive messages complying with the SOME/IP communication protocol for the service-oriented communication.

In the in-vehicle communication system according to the present embodiment, the relay ECU 3 is connected to the integrated ECU 1 through the Ethernet communication line and connected to the one or more ECUs 5 through the CAN bus. The relay ECU 3 communicates with the integrated ECU 1 in compliance with the SOME/IP communication protocol for service-oriented communication, and communicates with the ECUs 5 in compliance with the CAN communication protocol. The relay ECU 3 receives information delivered from the integrated ECU 1 and transmits it to the ECUs 5. The relay ECU 3 receives the information transmitted from the ECUs 5 and transits it to the integrated ECU 1 to thereby allow the integrated ECU 1 to store the information received from the ECU 5 in the stream DB 12c. This can anticipate achievement of the in-vehicle communication system provided with different communication protocols including the service-oriented communication.

In the in-vehicle communication system according to the present embodiment, the relay ECU 3 makes a registration request to the integrated ECU 1 for a delivery destination of the information stored in the stream DB 12c of the integrated ECU 1. Thus, the relay ECU 3 can register, in the integrated ECU 1, the delivery destination of the information required by the one or more ECUs 5 connected thereto, for example, and can acquire the necessary information from the integrated ECU 1 and transmit it to the ECU 5.

In the present embodiment, the network configuration of the in-vehicle communication system illustrated in FIG. 1, the device configuration illustrated in FIGS. 2 and 5, the information stored in the table illustrated in FIG. 3 and the information stored in the database illustrated in FIG. 4 are examples though not limited thereto. Though the communication protocols used in the in-vehicle communication system according to the present embodiment are communication protocols including SOME/IP, Ethernet, CAN and the like, various communication protocols may be adopted without being limited to the above-described ones.

Figure 11:
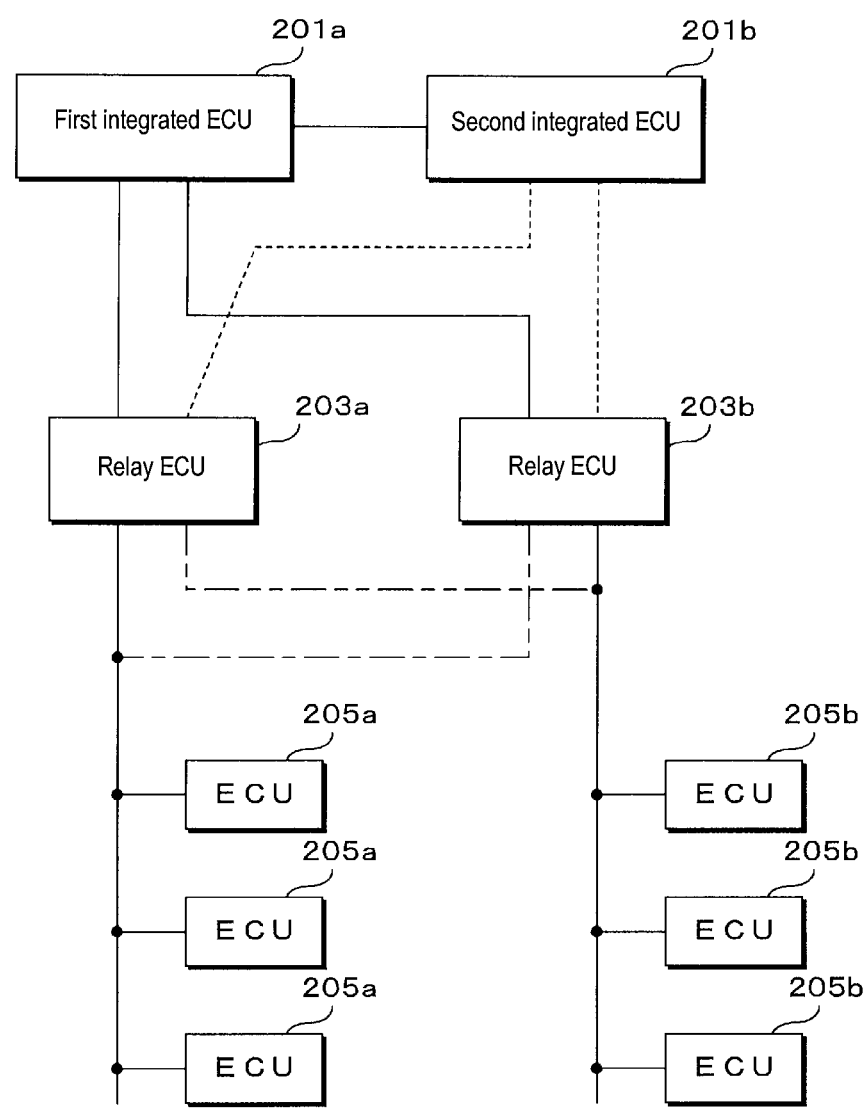
FIG. 11 is a schematic diagram illustrating the configuration of an in-vehicle communication system according to a second embodiment.

FIG. 11 is a schematic diagram illustrating the configuration of an in-vehicle communication system according to a second embodiment. Relative to the in-vehicle communication system according to the above-mentioned first embodiment, the in-vehicle communication system according to the second embodiment is configured to provide a device and a network with redundancy in order to deal with an abnormality or a malfunction occurring to the device or the network. The in-vehicle communication system according to the second embodiment has two integrated ECUs including a first integrated ECU 201a and a second integrated ECU 201b. The first integrated ECU 201a performs the same processing as the integrated ECU1 in the vehicle communication system according to the first embodiment under a normal condition where no abnormality occurs.

The first integrated ECU 201a is connected to the second integrated ECU 201b through a communication line to allow communication complying with the Ethernet communication protocol, for example. When storing the time-series information in its own stream DB 12c, the first integrated ECU 201a transmits the same time-series information to the second integrated ECU 20b to store it in the stream DB 12c contained in the second integrated ECU 201b. In other words, the second integrated ECU 201b creates, in its own stream DB 12c, a backup copy of the information stored by the first integrated ECU 201a. The first integrated ECU 201a may transmit the information of the delivery destination table 12b to the second integrated ECU 201b.

The second integrated ECU 201b is connected to one or more relay ECUs 203a and 203b connected to the first integrated ECU 201a through individual communication lines (indicated by dashed lines in FIG. 11). The relay ECUs 203a and 203b according to the second embodiment are each connected to the two integrated ECUs of the first integrated ECU 201a and the second integrated ECU 201b through individual communication lines. In the normal condition where no abnormality occurs, the first integrated ECU 201a and the relay ECUs 203a and 203b communicate with each other while the second integrated ECU 201b and the relay ECUs 203a and 203b do not communicate with each other.

The second integrated ECU 201b receives the information transmitted from the first integrated ECU 201a and stores it in its own stream DB 12c and determines that an abnormality occurs in the first integrated ECU 201a if not receiving information from the first integrated ECU 201a continues for a predetermined time or longer, for example. For example, the first integrated ECU 201a may report to the second integrated ECU 201b that an abnormality occurs to its own device if detecting an abnormality in its own device, or if detecting an abnormality in the communication route between its own device and the relay ECU 203a, 203b. If determining that an abnormality occurs in the first integrated ECU 201a, the second integrated ECU 201b reports to the relay ECUs 203a and 203b that an abnormality occurs.

The relay ECUs 203a and 203b having received a report of occurrence of an abnormality from the second integrated ECU 201b stop communicating with the first integrated ECU 201a and start communicating with the second integrated ECU 201b. From then on, the second integrated ECU 201b and the relay ECUs 203a and 203b communicate with each other. The second integrated ECU 201b stores the time-series information contained in the message received from the relay ECU 203a and 203b in the stream DB12c, and delivers the time-series information stored in the stream DB 12c to the relay ECUs 203a and 203b.

In the in-vehicle communication system, the relay ECU 203a is connected to one or more ECUs 205a through the CAN bus while the relay ECU 203b is connected to one or more ECUs 205b through the CAN bus. In addition, in the in-vehicle communication system according to the second embodiment, the relay ECU 203a is connected to the CAN bus on which the relay ECU 203b and the ECU 205b communicate (this communication route is indicated by the dot-dot-dash line in FIG. 11), and can monitor the communication status of the relay ECU 203b and the ECU 205b as well as communicate with the relay ECU 203b and the ECU 205b. Likewise, the relay ECU 203b is connected to the CAN bus on which the relay ECU 203a and the ECU 205a communicate (this communication route is indicated by the dot-and-dash line in FIG. 11) and can monitor the communication status of the relay ECU 203a and the ECU 205a as well as communicate with the relay ECU 203a and the ECU 205a. In FIG. 11, the communication routes illustrated by the dot-and-dash line and the dot-dot-dash line are redundant communication routes that are used when an abnormality or the like occurs in the relay ECUs 203a, 203b.

The relay ECU 203a communicates with the ECU 205a and monitors the communication between the relay ECU 203b and the ECU 205b under the normal condition where no abnormality occurs. The relay ECU 203a determines that an abnormality occurs in the relay ECU 203b if not receiving information transmitted from the relay ECU 203b continues for a predetermined time or longer, for example. For example, if detecting an abnormality in the relay ECU 203b, the first integrated ECU 201a may report it to the relay ECU 203a. If determining that an abnormality occurs in the relay ECU 203b, the relay ECU 203a reports an abnormality in the relay ECU 203b to the first integrated ECU 201a (or second integrated ECU 201b) and the ECU 205b.

The first integrated ECU 201a having been reported the abnormality of the relay ECU 203b from the relay ECU 203a transmits the type of information registered as to be transmitted to the relay ECU 203b in the delivery destination table 12b to the relay ECU 203a from then on. The relay ECU 203a receives a message from the first integrated ECU 201a and transmits the information contained in the received message to the ECUs 205a and 205b. Here, the relay ECU 203a preferably transmits information contained in the received message by differentiating information required by the ECU 205a and information required by the ECU 205b from each other. Hence, the relay ECU 203a may store in advance which type of information is required by the ECU 205b, and may obtain information on the type of information required from the ECU 205b, for example. Note that the relay ECU 203a may transmit the information contained in the message received from the first integrated ECU 201a to both of the ECUs 205a and 205b without differentiating the information between them.

Since the same applies to the case where an abnormality occurs in the relay ECU203a to cause the relay ECU 203b to transmit information from the first integrated ECU 201a to the ECU 205a, the description thereof is omitted.

Figure 12:
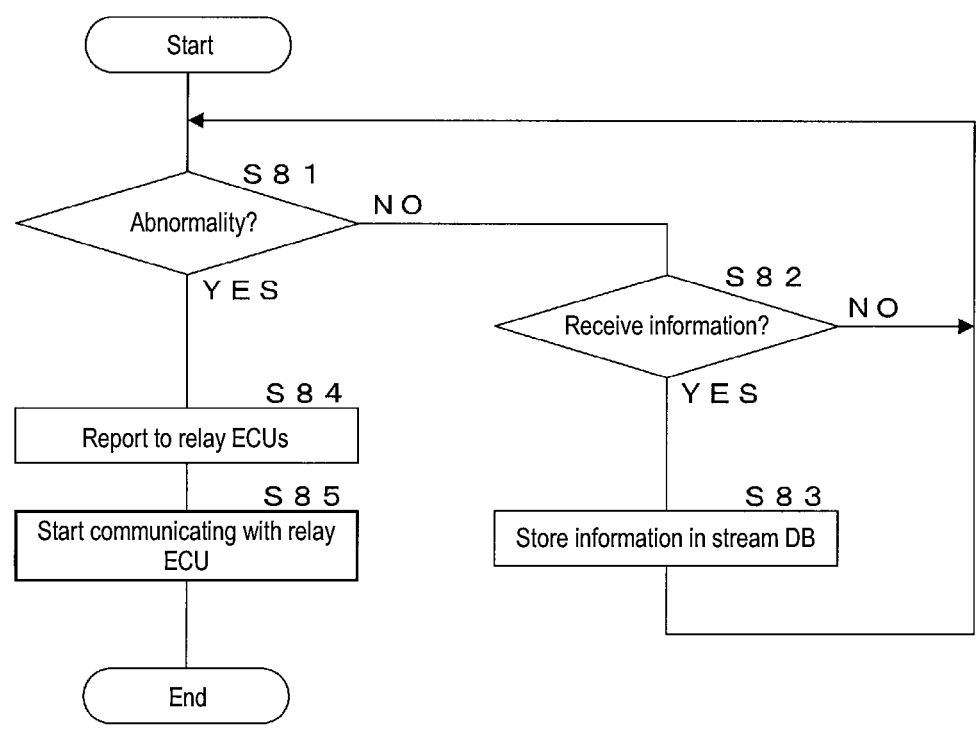
FIG. 12 is a flowchart of a processing procedure performed by a second integrated ECU according to the second embodiment.

FIG. 12 is a flowchart of a processing procedure performed by the second integrated ECU 201b according to the second embodiment. The second integrated ECU 201b determines whether or not an abnormality occurs in the first integrated ECU 201a by judging that information from the first integrated ECU 201a has not been transmitted for a predetermined time or longer, for example (step S81). If no abnormality occurs in the first integrated ECU 201a (S81: NO), the second integrated ECU 201b determines whether or not the time-series information transmitted from the first integrated ECU 201a is received (step S82). If not receiving the time-series information (S82: NO), the second integrated ECU 201b returns the processing to step S81. If receiving the time-series information (S82: YES), the second integrated ECU 201b stores the received information in its own stream DB 12c (step S83) and returns the processing to step S81.

If determining that an abnormality occurs in the first integrated ECU 201a (S81: YES), the second integrated ECU 201b reports to the one or more relay ECUs 203a and 203b connected to its own device that an abnormality occurs in the first integrated ECU 201a (step S84). Then, the second integrated ECU 201b starts communicating with the relay ECUs 203a, 203b in compliance with the SOME/IP communication protocol (step S85) and ends the processing.

Figure 13:
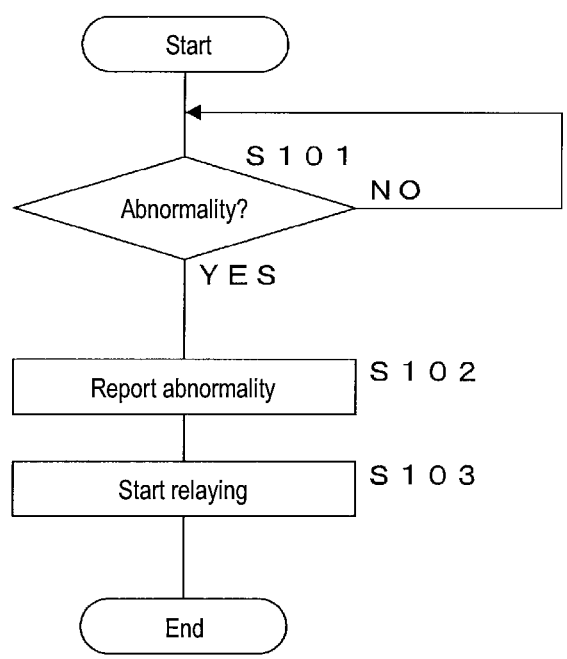
FIG. 13 is a flowchart of a processing procedure performed by the relay ECU according to the second embodiment.

FIG. 13 is a flowchart of a processing procedure performed by the relay ECU 203a according to the second embodiment. The relay ECU 203a according to the second embodiment continuously monitors the CAN bus on which the relay ECU 203b and ECU 205b communicate with each other, and determines whether or not an abnormality occurs in the relay ECU 203b by judging that no information has been transmitted by the relay ECU 203b for a predetermined time or longer, for example (step S101). If no abnormality occurs in the relay ECU 203b (S101: NO), the relay ECU 203a continues to perform monitoring until an abnormality occurs in the relay ECU 203b.

If an abnormality occurs in the relay ECU 203b (S101: YES), the relay ECU 203a reports to the first integrated ECU 201a (or the second integrated ECU 201b), which delivers the time-series information, that an abnormality occurs in the relay ECU 203b (step S102). Then, the relay ECU 203a starts relaying transmission and reception of information between the first integrated ECU 201a and the ECU 205b (step S103) and ends the processing.

In the in-vehicle communication system according to the second embodiment with the above-described configuration, the two integrated ECUs including the first integrated ECU 201a and the second integrated ECU 201b are installed on the vehicle 100. The first integrated ECU 201a and the second integrated ECU 201b are each connected to the relay ECUs 203a, 203b through individual communication lines. The first integrated ECU 201a transmits time series information stored in its own stream DB 12c to the second integrated ECU 201b. The second integrated ECU 201b having received the information from the first integrated ECU 201a can store the received information in its own stream DB 12c. This makes it possible for the second integrated ECU 201b to transmit the time-series information to the relay ECU203a and 203b instead of the first integrated ECU 201a if the first integrated ECU 201a cannot deliver information for some reason.

In the in-vehicle communication system according to the second embodiment, the relay ECU 203a, 203b are connected to the first integrated ECU 201a and the second integrated ECU 201b, and communicate with both of the integrated ECUs. The relays ECUs 203a, 203b normally transmit and receive information to and from the first integrated ECU 201a, and transmit and receive information to and from the second integrated ECU 201b if an abnormality of the first integrated ECU 201a is detected. This allows the relay ECUs 203a and 203b to continue processing using the second integrated ECU 201b even if any abnormality occurs in the first integrated ECU 201a.

In the in-vehicle communication system according to the second embodiment, the relay ECU 203a is also connected to the one or more ECUs 205b connected to the relay ECU 203b through the communication line, which allows communication with the ECU 205b to which the relay ECU203b relays message. If an abnormality is detected in the relay ECU 203b, the relay ECU 203a transmits and receives information to and from the one or more ECUs 205b connected to the relay ECU 203b. This allows the relay ECUs 203a to communicate with the ECU 205b instead of the relay ECU 203b even if any abnormality occurs in the relay ECU 203b.

Since the in-vehicle communication system according to the second embodiment has a similar configuration to the in-vehicle communication system according to the first embodiment other than the above description, corresponding parts are denoted by similar reference codes and detailed description thereof will not be repeated.

The in-vehicle communication device and in-vehicle relay device are each provided with a computer composed of a microprocessor, a ROM, a RAM and the like. The arithmetic processing unit in the microprocessor or the like may read out a computer program including a sequence diagram or a part or all of the steps of the flowchart as shown in FIGS. 2 to 5, from the storage unit such as the ROM, the RAM and the like and execute the program. The computer programs for these multiple devices can be installed from an external server device or the like. These computer programs are circulated while being stored in a recording medium such as a CD-ROM, a DVD-ROM, a semiconductor memory or the like.

It is to be understood that the embodiments disclosed here is illustrative in all respects and not restrictive. The scope of the present disclosure is defined by the appended claims, and all changes that fall within the meanings and the bounds of the claims, or equivalence of such meanings and bounds are intended to be embraced by the claims.

The invention claimed is:

1. An in-vehicle communication system, comprising: first and second in-vehicle communication devices each having a stream database storing received time-series information and
   a plurality of in-vehicle relay devices each connected to the first and second in-vehicle communication devices through individual first communication lines, wherein
   each of the in-vehicle relay devices is connected to a plurality of in-vehicle control devices through a second communication line,
   the first and second in-vehicle communication devices and the in-vehicle relay devices communicate in compliance with a first communication protocol for service-oriented communication,
   the in-vehicle relay devices and the in-vehicle control devices communicate in compliance with a second communication protocol different from the first communication protocol,
   the first in-vehicle communication device
   stores time-series information received from one of the in-vehicle relay devices in the stream database,
   accepts a registration request for a delivery destination of time-series information stored in the stream database from one of the in-vehicle relay devices and registers the one of the in-vehicle relay devices as a delivery destination of the time-series information,
   reads time-series information stored in the stream database to deliver read information to one of the in-vehicle relay devices registered as a delivery destination, and
   transmits time-series information stored in the stream database to the second in-vehicle communication device, the second in-vehicle communication device
receives time-series information transmitted from the first in-vehicle communication device and stores the time-series information in the stream database,
delivers time-series information of the first in-vehicle communication device stored in the stream database to one of the in-vehicle relay devices if an abnormality of the first in-vehicle communication device is detected, each of the in-vehicle relay devices
requests the first in-vehicle communication device to register a delivery destination of time-series information stored in the stream database of the in-vehicle communication device,
receives time-series information delivered from the first in-vehicle communication device and transmit the time-series information to the in-vehicle control devices,
receives time-series information transmitted from the in-vehicle control devices and transmits the time-series information to the first in-vehicle communication device, to store the time-series information in a stream database of the first in-vehicle communication device,
determines a presence or an absence of an abnormality of the first in-vehicle communication device, and
transmits and receives time-series information to and from the first in-vehicle communication device, and transmits and receives time-series information to and from the second in-vehicle communication device if it is determined that an abnormality occurs in the first in-vehicle communication device.

* * * * *